US012789262B2

(12) United States Patent
Sakamoto et al.

(10) Patent No.: US 12,789,262 B2
(45) Date of Patent: Nov. 10, 2026

(54) INSERT AND CUTTING TOOL

(71) Applicant: KYOCERA CORPORATION, Kyoto (JP)

(72) Inventors: Yoshiki Sakamoto, Hioki (JP); Satoshi Mori, Satsumasendai (JP)

(73) Assignee: KYOCERA CORPORATION, Kyoto (JP)

( * ) Notice: Subject to any disclaimer, the term of this patent is extended or adjusted under 35 U.S.C. 154(b) by 273 days.

(21) Appl. No.: 18/701,254

(22) PCT Filed: Oct. 6, 2022

(86) PCT No.: PCT/JP2022/037494

§ 371 (c)(1),
(2) Date: Apr. 15, 2024

(87) PCT Pub. No.: WO2023/074310

PCT Pub. Date: May 4, 2023

(65) Prior Publication Data

US 2024/0424578 A1 Dec. 26, 2024

(30) Foreign Application Priority Data

Oct. 29, 2021 (JP) ................................ 2021-178350

(51) Int. Cl.
*B23B 27/16* (2006.01)
*C22C 14/00* (2006.01)

(52) U.S. Cl.
CPC .......... *B23B 27/1611* (2013.01); *C22C 14/00* (2013.01); *B23B 2228/105* (2013.01)

(58) Field of Classification Search
CPC ........... B23B 27/1611; B23B 2228/105; B23B 27/14; C22C 14/00; C23C 14/06; C23C 14/48
See application file for complete search history.

(56) References Cited

U.S. PATENT DOCUMENTS

2010/0129168 A1* 5/2010 Waki .................. C23C 14/0641 407/119
2018/0347034 A1* 12/2018 Bolz ..................... C23C 28/324

FOREIGN PATENT DOCUMENTS

| | | | |
|---|---|---|---|
| CN | 101848782 | A | 9/2010 |
| JP | 3099834 | B2 | 10/2000 |
| WO | 2009119682 | A1 | 10/2009 |

* cited by examiner

*Primary Examiner* — Lee A Holly
(74) *Attorney, Agent, or Firm* — HAUPTMAN HAM, LLP

(57) ABSTRACT

An insert according to the present disclosure includes a base and a coating layer covering a surface of the base. The base is made of cermet. The coating layer is made of $Ti_{1-a-b-c-d}Al_aM_bW_cSi_d(C_xN_{1-x})$ (M is one or more metal elements selected from Nb, Mo, Ta, Hf, and Y, where $0.40 \le a \le 0.55$, $0.01 \le b \le 0.1$, $0.01 \le c \le 0.1$, $0.01 \le d \le 0.05$, and $0 \le x \le 1$). The insert according to an embodiment of the present disclosure includes an intermediate layer containing Ti and located between the base and the coating layer. The intermediate layer has an average thickness of 20 nm or more and 80 nm or less.

8 Claims, 12 Drawing Sheets

| | Non-inserted article (no intermediate layer) | No.1 (Ti) | | No.2 (TiAl) | | No.3 (AlCr) | |
|---|---|---|---|---|---|---|---|
| | | 40nm | 200nm | 40nm | 200nm | 40nm | 200nm |
| Hardness | 100% | 128% | 107% | 107% | 89% | 111% | 93% |
| Stress | 100% | 87% | 84% | 94% | 90% | 91% | 87% |
| Adhesion force | 100% | 150% | 100% | 116% | 100% | 104% | 100% |

FIG. 8

| | Atomic% | | | | | | | |
|---|---|---|---|---|---|---|---|---|
| | N | Al | Ar | Ti | Nb | Mo | W | Total |
| P1 | 21 | 1 | 5 | 67 | 1 | 4 | 0 | 100 |
| P2 | 25 | 1 | 1 | 67 | 1 | 4 | 1 | 100 |
| P3 | 21 | 1 | 5 | 68 | 1 | 4 | 0 | 100 |
| P4 | 22 | 1 | 1 | 71 | 1 | 4 | 0 | 100 |

FIG. 11

INSERT AND CUTTING TOOL

CROSS-REFERENCE TO RELATED APPLICATIONS

This application is a national stage entry according to 35 U.S.C. 371 of PCT Application No. PCT/JP2022/037494 filed on Oct. 6, 2022, which claims priority to Japanese Patent Application No. 2021-178350, filed on Oct. 29, 2021.

TECHNICAL FIELD

The present disclosure relates to an insert and a cutting tool.

BACKGROUND OF INVENTION

Cermet containing titanium (Ti) as a main constituent has been widely used as a base of a member requiring wear resistance, slidability, and chipping resistance of a cutting tool, a wear resistant member, a sliding member, or the like.

Patent Document 1 discloses a cutting tool made of cermet in which an eluted alloy phase composed of a metal binder phase constituent is located on a surface of a cermet base containing a binder phase constituent mainly composed of cobalt (Co) and nickel (Ni) and a TiN layer having an anti-diffusion effect is located on the eluted alloy phase.

CITATION LIST

Patent Literature

Patent Document 1: Japanese Patent No. 3099834

SUMMARY

An insert according to an aspect of the present disclosure includes a base and a coating layer covering a surface of the base. The base is made of cermet. The coating layer is made of $Ti_{1-a-b-c-d}Al_aM_bW_cSi_d(C_xN_{1-x})$ (M is one or more metal elements selected from Nb, Mo, Ta, Hf, and Y, where $0.40 \leq a \leq 0.55$, $0.01 \leq b \leq 0.1$, $0.01 \leq c \leq 0.1$, $0.01 \leq d \leq 0.05$, and $0 \leq x \leq 1$). The insert according to an aspect of the present disclosure includes an intermediate layer containing Ti and located between the base and the coating layer. The intermediate layer has an average thickness of 20 nm or more and 80 nm or less.

BRIEF DESCRIPTION OF THE DRAWINGS

FIG. 8 is a table summarizing the results of the hardness measurement, the stress measurement, and the adhesion force measurement.

FIG. 11 is a table showing element constituent ratios in atomic % at measurement points P1 to P4 illustrated in FIG. 10.

DESCRIPTION OF EMBODIMENTS

The following is a detailed description of an insert and a cutting tool according to the present disclosure (hereinafter referred to as "embodiments") with reference to the drawings. The insert and the cutting tool according to the present disclosure are not limited by the embodiments. The embodiments can be appropriately combined provided that no contradiction in processing content arises. In the following embodiments, the same portions are denoted by the same reference signs, and redundant explanations are omitted.

In the embodiments described below, expressions such as "constant", "orthogonal", "perpendicular", and "parallel" may be used, but these expressions do not mean exactly "constant", "orthogonal", "perpendicular", and "parallel". In other words, each of the expressions described above allows for deviations in, for example, manufacturing accuracy, installation accuracy, or the like.

In the related art, it is known that forming a coating layer on a base made of cermet causes the residual stress of the coating layer to increase When the residual stress of the coating layer is high, the coating layer is easily peeled off from the base, making it difficult to increase wear resistance of the insert. Forming a low-hardness coating layer allows the residual stress of the coating layer to be decreased. However, in this case, the wear resistance of the coating layer itself decreases, and thus it is difficult to increase the wear resistance of the insert.

For this reason, providing an insert having excellent wear resistance and a cutting tool is expected.

Insert

Figure 1:
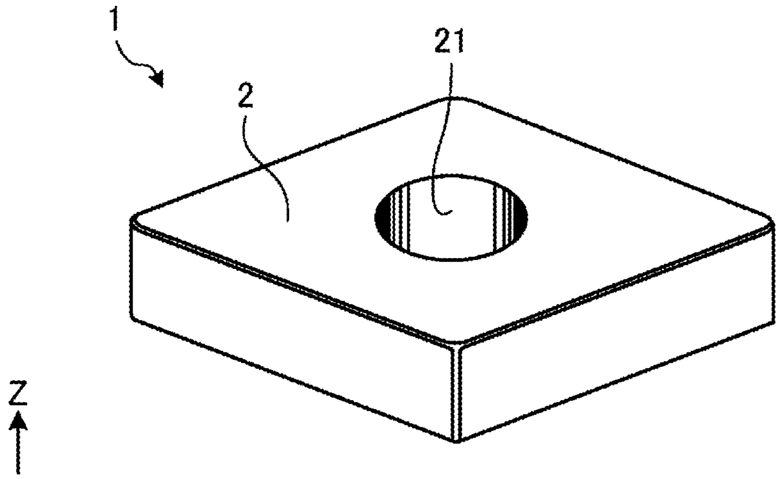
FIG. 1 is a perspective view illustrating an example of an insert according to an embodiment.

FIG. 1 is a perspective view illustrating an example of an insert according to an embodiment.

Figure 2:
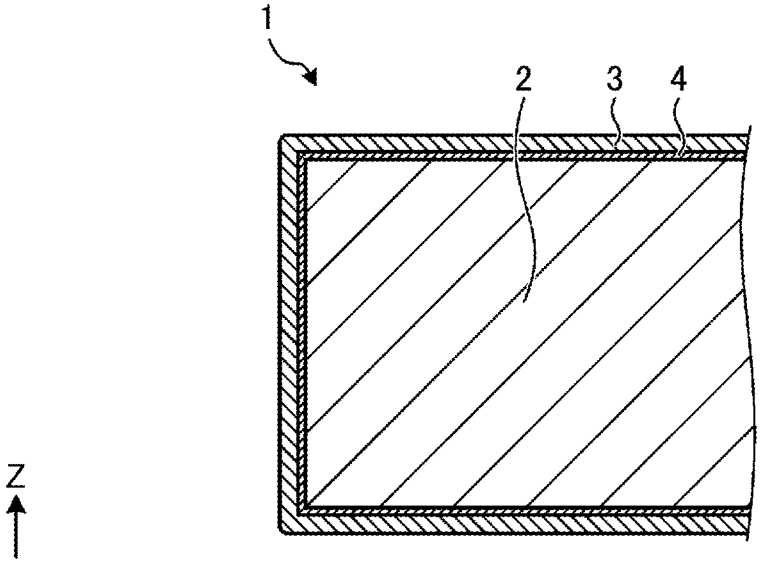
FIG. 2 is a side cross-sectional view illustrating an example of an insert according to an embodiment.

FIG. 2 is a side cross-sectional view illustrating an example of an insert 1 according to an embodiment. As illustrated in FIG. 1 and FIG. 2, the insert 1 according to the embodiment includes a base 2, a coating layer 3, and an intermediate layer 4.

Base 2

The base 2 has, for example, a hexagonal shape in which shapes of an upper surface and a lower surface (surfaces intersecting the Z-axis illustrated in FIG. 1) are parallelograms.

One corner portion of the base 2 functions as a cutting edge portion. The cutting edge portion has a first surface (for example, an upper surface) and a second surface (for example, a side surface) connected to the first surface. In the embodiment, the first surface functions as a "rake face" for scooping chips generated by cutting, and the second surface functions as a "flank face". A cutting edge is located on at least a part of a ridge line where the first surface and the second surface intersect with each other, and the insert 1 cuts a workpiece when the cutting edge is applied on the workpiece.

A through hole 21 that vertically extends through the base 2 may be located at a center portion of the base 2. In this case, a screw 75 for attaching the insert 1 to a holder 70 described below is inserted into the through hole 21 (see FIG. 4).

The base 2 is made of cermet. The cermet contains a hard layer and a binder phase. The hard layer may contain, for example, Ti. For example, the hard layer may contain, as a main constituent, at least one metal element selected from TiCN, TiC, TiN, and TiMN (M is at least one selected from metal of Groups 4, 5, and 6 in the periodic table excluding Ti, Al, and Si). The binder phase contains an iron group metal such as Ni or Co as a main constituent. The main constituent includes 50 mass % or more of component constituents.

Coating Layer 3

The coating layer 3 is coated on the base 2 for the purpose of, for example, improving wear resistance, heat resistance, and the like of the base 2. Although an example in which the coating layer 3 covers the entire surface of the base 2 is illustrated in FIG. 2, the coating layer 3 is not necessarily required to cover the entire surface of the base 2. When the coating layer 3 is located on the first surface (here, the upper surface) of the base 2, the first surface has high wear resistance and heat resistance. When the coating layer 3 is located on the second surface (here, the side surface) of the base 2, the second surface has high wear resistance and heat resistance.

The coating layer 3 may contain, for example, a cubic crystal composed of one or more elements selected from the group consisting of Group 4 elements, Group 5 elements, Group 6 elements in the periodic table, Si and Al, and one or more elements selected from the group consisting of C, N, and O. In such a configuration, the oxidation resistance of the coating layer 3 is improved. As a result, the wear resistance of the coating layer 3 is further improved.

For example, the coating layer 3 may be a TiAlSiN-based layer containing Ti, Al, Si, and N. The coating layer 3 containing the metal (Ti) included in the intermediate layer 4 is positioned on the intermediate layer 4 as just described, and thus the adhesion between the intermediate layer 4 and the coating layer 3 is increased. This makes it difficult for the coating layer 3 to peel off from the intermediate layer 4, so the durability of the coating layer 3 is increased. The expression "TiAlSiN" means that Ti, Al, Si, and N are present at an arbitrary ratio, and does not necessarily mean that Ti, Al, Si, and N are present at a ratio of 1:1:1:1.

As a specific example, the coating layer 3 may be a layer made of $Ti_{1-a-b-c-d}Al_aM_bW_cSi_d(C_xN_{1-x})$. Here, M is one or more metal elements selected from the group consisting of Nb, Mo, Ta, Hf, and Y. Furthermore, a to d respectively satisfy $0.40 \leq a \leq 0.55$, $0.01 \leq b \leq 0.1$, $0.01 \leq c \leq 0.1$, and $0.01 \leq d \leq 0.05$, and x is $0 \leq x \leq 1$.

The coating layer 3 may have hardness of 33.5 GPa or more and compressive residual stress of 1.4 GPa or less. In such a configuration, the adhesion force between the base 2 and the coating layer 3 is further improved. The wear resistance of the coating layer 3 is improved, and thus the life of the insert 1 is prolonged.

The adhesion strength (hereinafter referred to as "adhesion force") of the coating layer 3 to the base 2 may be 110 N or more in terms of a peeling load in a scratch test. In such a configuration, the internal stress and thermal stress that determine the adhesion force between the base 2 and the coating layer 3 are optimized, and the coating layer 3 is less likely to peel off while maintaining high hardness of the coating layer 3. As a result, the life of the insert 1 is further prolonged.

Method for Manufacturing Coating Layer

The coating layer may be formed by, for example, a physical vapor deposition method. Examples of the physical vapor deposition method may include an ion plating method and a sputtering method. For example, when the coating layer is formed by an ion plating method, the coating layer may be fabricated by the following method.

An example of a method for fabricating the coating layer by an ion plating method will be described. First, as an example, each metal target of Ti, Al, M (M is one or more metal elements selected from Nb, Mo, Ta, Hf, and Y), W, Si, a composite alloy target, or a sintered body target is prepared.

Then, the target serving as a metal source is vaporized and ionized by arc discharge, glow discharge, or the like. The ionized metal is reacted with a nitrogen ($N_2$) gas of a nitrogen source and deposited on the surface of the base. The coating layer can be formed by the procedure described above.

In the above procedure, the temperature of the base may be set to 500° C. or higher to 600° C. or lower, the nitrogen gas pressure may be set to 1.0 Pa or higher to 6.0 Pa or lower, a direct-current bias voltage of −50 V or higher to −200 V or lower may be applied to the base, and the arc discharge current may be set to 100 A or higher to 200 A or lower.

The composition of the coating layer can be adjusted by independently controlling the voltage and current values at the time of arc discharge and glow discharge applied to a variety of metal targets, for each target. The composition of the coating layer can be adjusted by controlling the composition of the metal target, the coating time, and the atmospheric gas pressure.

Intermediate Layer 4

The intermediate layer 4 may be located between the base 2 and the coating layer 3. Specifically, the intermediate layer 4 has one surface in contact with the upper surface of the base 2 and the other surface in contact with the lower surface of the coating layer 3.

The intermediate layer 4 contains Ti as a main constituent. Such an intermediate layer 4 has higher adhesion to the base 2 than to the coating layer 3. The ratio of Ti in the intermediate layer 4 can be identified by, for example, analysis using an energy dispersive X-ray spectrometer (EDS) attached to a scanning transmission electron microscope (STEM).

As described above, the insert 1 according to the embodiment includes the intermediate layer 4 having higher wettability with the base 2 than the coating layer 3 between the base 2 and the coating layer 3, and thus the adhesion between the base 2 and the coating layer 3 is high. Since the intermediate layer 4 also has high adhesion to the coating layer 3, the coating layer 3 is less likely to peel off from the intermediate layer 4.

The average thickness of the intermediate layer 4 may be 20 nm or more and 80 nm or less. When the thickness of the intermediate layer 4 is 20 nm or more, the adhesion effect between the coating layer 3 and the base 2 is further exhibited, and when the thickness of the intermediate layer 4 is 80 nm or less, the occurrence and propagation of cracks from the intermediate layer 4 are suppressed. Therefore, setting the average thickness of the intermediate layer 4 to 20 nm or more and 80 nm or less allows the adhesion force between the base 2 and the coating layer 3 to be further improved and the wear resistance and fracture resistance of the insert 1 to be further improved.

The intermediate layer 4 according to the embodiment may contain Ar other than Ti. The insert 1 including the intermediate layer 4 containing Ti and Ar between the base 2 and the coating layer 3 has higher adhesion force between the base 2 and the coating layer 3.

More specifically, the intermediate layer 4 containing Ti and Ar has a high stress relaxation effect compared to an intermediate layer containing only Ti (not containing Ar). The intermediate layer 4 containing Ar can mitigate a rapid change in stress from the base 2 to the coating layer 3. As a result, the adhesion force between the base 2 and the coating layer 3 is thought to be improved.

Figure 3:
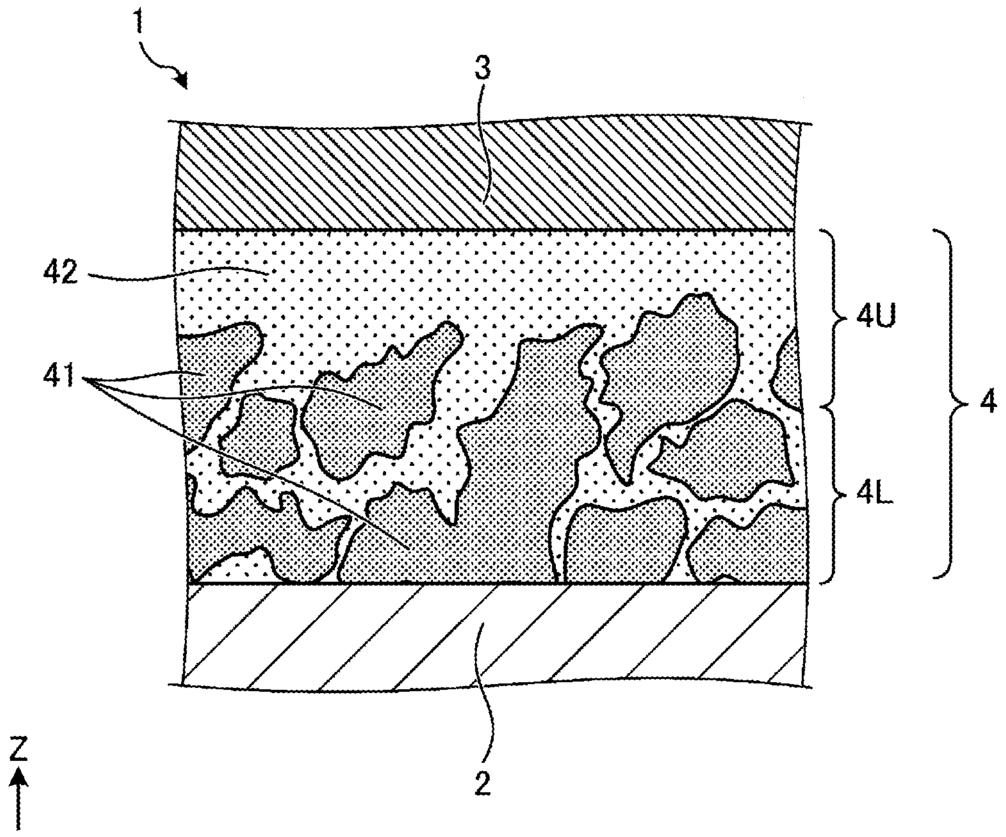
FIG. 3 is a schematic enlarged view of a cross-section of an intermediate layer.

FIG. 3 is a schematic enlarged view of a cross-section of the intermediate layer 4. As illustrated in FIG. 3, the intermediate layer 4 may include a plurality of Ar-enriched regions 41. The Ar-enriched regions 41 are each a region having an Ar content higher than that of the other region 42 of the intermediate layer 4. For example, the presence of the Ar-enriched regions 41 can be specified by, for example, analysis using an energy dispersive X-ray spectrometer (EDS) attached to a scanning transmission electron microscope (STEM).

The Ar-enriched regions 41 may be distributed in island shapes in the intermediate layer 4. Here, "distributed in island shapes" means that the Ar-enriched regions 41 are present in an isolated state while not being in contact with each other. The shape of each Ar-enriched region 41 is not particularly limited. For example, the Ar-enriched region 41 may have a shape composed of curved lines, such as a circle or an ellipse, a shape composed of straight lines, such as a polygon, or a shape composed of curved lines and straight lines.

When the plurality of Ar-enriched regions 41 are distributed in island shapes as just described, the effect of mitigating a rapid change in stress from the base 2 to the coating layer 3 is further enhanced, and thus the adhesion force between the base 2 and the coating layer 3 is further improved. As a result, the wear resistance and fracture resistance of the insert 1 are improved.

The plurality of Ar-enriched regions 41 may be distributed, in the intermediate layer 4, more in a region 4L on a side of the base 2 from a center in a thickness direction (here, the Z-axis direction) of the intermediate layer 4 than in a region 4U on a side of the coating layer 3 from the center in the thickness direction.

When the plurality of Ar-enriched regions 41 is distributed more in the region on the side of the base 2 from the center in the thickness direction, a rapid change in stress from the base 2 to the intermediate layer 4 is mitigated, and the adhesion force between the base 2 and the intermediate layer 4 and furthermore the adhesion force between the base 2 and the coating layer 3 are further improved. As a result, the wear resistance and fracture resistance of the insert 1 are improved.

The Ar-enriched region 41 may contain 3 atomic % or more of Ar. In such a configuration, the stress generated between the base 2 and the coating layer 3 is decreased, and in addition, the hardness of the coating layer 3 is improved. As a result, the wear resistance of the coating layer 3 can be improved.

The intermediate layer 4 may contain 65 atomic % or more of Ti and 1 atomic % or more of Ar. In such a configuration, the hardness of the coating layer 3 can be further enhanced while the stress generated between the base 2 and the coating layer 3 is decreased. As a result, the wear resistance of the insert 1 is improved.

The intermediate layer 4 having the configuration described above can be obtained by, for example, the following manufacturing method.

Method for Manufacturing Intermediate Layer

The base is heated under a reduced pressure environment of $8\times10^{-3}$ Pa or higher and $1\times10^{-4}$ Pa or lower and the surface temperature thereof is set to 500° C. or higher and 600° C. or lower. Then, an argon gas is introduced as an atmospheric gas, and the pressure is maintained at 3.0 Pa. Then, a bias voltage is set to −400 V, and an argon bombardment treatment is performed for 11 minutes (Ar bombardment pretreatment). Then, the pressure is reduced to 0.1 Pa, an arc current of 100 A or higher and 180 A or lower is applied to a Ti metal evaporation source, and the base is treated for 0.5 minutes or more and 1.0 minute or less to form a Ti-containing layer as the intermediate layer on the surface of the base (Ti-containing layer film forming treatment). Thereafter, the argon gas is introduced as an atmospheric gas, and the pressure is maintained at 3.0 Pa or higher and 4.0 Pa or lower, the bias voltage is set to −200 V, and the argon bombardment treatment is performed for 0.3 minutes or more and 0.8 minutes or less (Ar bombardment post-treatment).

Then, the Ti-containing layer film forming treatment and the Ar bombardment post-treatment are alternately repeated one or more times and twenty times or less. When repeated once, the intermediate layer of about 10 nm is formed, and when repeated twenty times, the intermediate layer of about 200 nm is formed.

Figure 4:
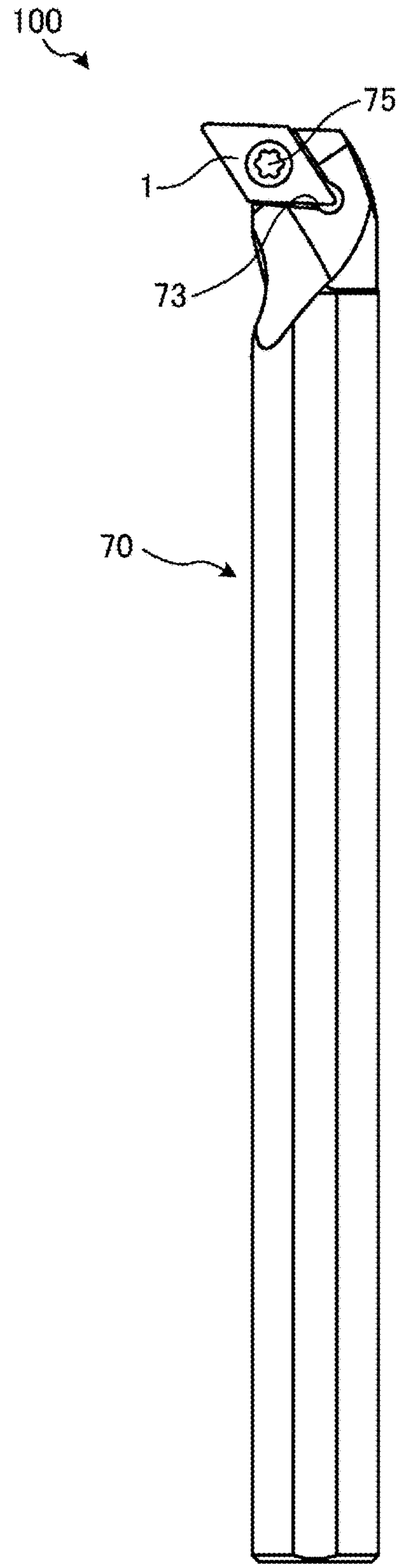
FIG. 4 is a front view illustrating an example of a cutting tool according to an embodiment.

Treatment Conditions of Ar Bombardment Pretreatment (1) Bias voltage: −−400 V (2) Pressure: 3 Pa or lower (3) Treatment time: 11 minutes Treatment Conditions of Ti-Containing Layer Film Forming Treatment (1) Arc current: 100 A or higher and 180 A or lower (2) Bias voltage: −400 V (3) Pressure: 0.1 Pa (4) Treatment time: 0.5 minutes or more and 1 minute or less Treatment Conditions of Ar Bombardment Pro-Treatment (1) Bias voltage: −200 V (2) Pressure: 3 Pa or higher and 4 Pa or lower (3) Treatment time: 0.3 minutes or more and 0.8 minutes or less Cutting Tool The configuration of the cutting tool including the insert 1 described above will be described with reference to FIG. 4. FIG. 4 is a front view illustrating an example of the cutting tool according to an embodiment.

As illustrated in FIG. 4, a cutting tool 100 according to the embodiment includes the insert 1 and the holder 70 for fixing the insert 1.

The holder 70 is a rod-shaped member that extends from a first end (an upper end in FIG. 4) toward a second end (a lower end in FIG. 4). The holder 70 is made of, for example, steel or cast iron. Among these members, it is particularly preferable to use steel having high toughness.

The holder 70 includes a pocket 73 at an end portion on the first end side. The pocket 73 is a portion in which the insert 1 is mounted and has a seating surface intersecting with the rotation direction of the workpiece and a binding side surface inclined with respect to the seating surface. The seating surface is formed with a screw hole into which the screw 75 to be described below is screwed.

The insert 1 is located in the pocket 73 of the holder 70 and is mounted on the holder 70 by the screw 75. In other words, the screw 75 is inserted into the through hole 21 of the insert 1, and the tip end of the screw 75 is inserted into the screw hole formed in the seating surface of the pocket 73, and the screw portions are screwed together. Thus, the insert 1 is mounted on the holder 70 such that the cutting edge protrudes outward from the holder 70.

In the embodiment, a cutting tool used for so-called turning processing is described as an example. Examples of the turning processing include boring, external turning, and groove-forming. The cutting tool is not limited to a cutting tool used in turning processing. For example, the insert 1 may be used as a cutting tool used for milling processing. Examples of the cutting tool used for milling processing include a milling cutter such as a plain milling cutter, a face milling cutter, a side milling cutter, or a groove milling cutter, and an end mill such as a single-flute end mill, a multi-flute end mill, a taper-blade end mill, or a ball end mill.

EXAMPLE

An example of the present disclosure will be specifically described below. The present disclosure is not limited to the following example.

Samples No. 1 to No. 4 each including an intermediate layer and a coating layer on a base made of cermet including a hard phase containing Ti and a binder phase containing Co and Ni were produced. Sample No. 1 corresponds to Example of the present disclosure and includes an intermediate layer containing Ti and Ar and a TiAlN-based coating layer. Specifically, Sample No. 1 includes the coating layer made of TiAlNbWSiN. A specific composition of the coating layer included in Sample No. 1 is $Ti_{46}Al_{49}Nb_2W_2Si_1(N)$. The methods for manufacturing the intermediate layer and the coating layer are as described above. Sample No. 2 corresponds to Example of the present disclosure. Sample No. 2 includes an intermediate layer containing Ti and Al and a TiAlN-based coating layer similar to that of No. 1. Sample No. 3 corresponds to Comparative Example. Sample No. 3 includes an intermediate layer containing Al and Cr and a TiAlN-based coating layer similar to that of No. 1. Sample No. 4 corresponds to Example. Sample No. 4 includes an intermediate layer containing Ti and not containing Ar and a TiAlN-based coating layer similar to that of No. 1. For each of Samples No. 1 to No. 3, seven types of samples were prepared in which the thicknesses of the intermediate layers were respectively 10 nm, 20 nm, 40 nm, 80 nm, 120 nm, 160 nm, and 200 nm. For Sample No. 4, one type of sample was prepared in which the thickness of the intermediate layer was 40 nm. The thickness of the coating layer in each of Samples No. 1 to No. 4 was 3 μm.

Hardness Measurement

For Samples No. 1 to No. 4, a measurement range was set from the surface of the coating layer to a depth corresponding to 10% or more and less than 20% of the thickness of the coating layer, and the hardness was measured with an indentation load of 50 mN of an indenter. The measurement was performed by using a microindentation hardness tester "ENT-1100b/a" (manufactured by Elionix Inc.).

Specifically, a load-displacement curve was obtained by bringing the indenter into contact with the surface of the coating layer and then measuring the displacement (change in indentation depth) of the indenter when the load was varied by applying a load, holding a maximum load, and removing the load. Subsequently, the hardness was calculated from the obtained load-displacement curve. The series of measurements was performed 15 times each, and the average of hardness values measured 15 times was evaluated.

Figure 5:
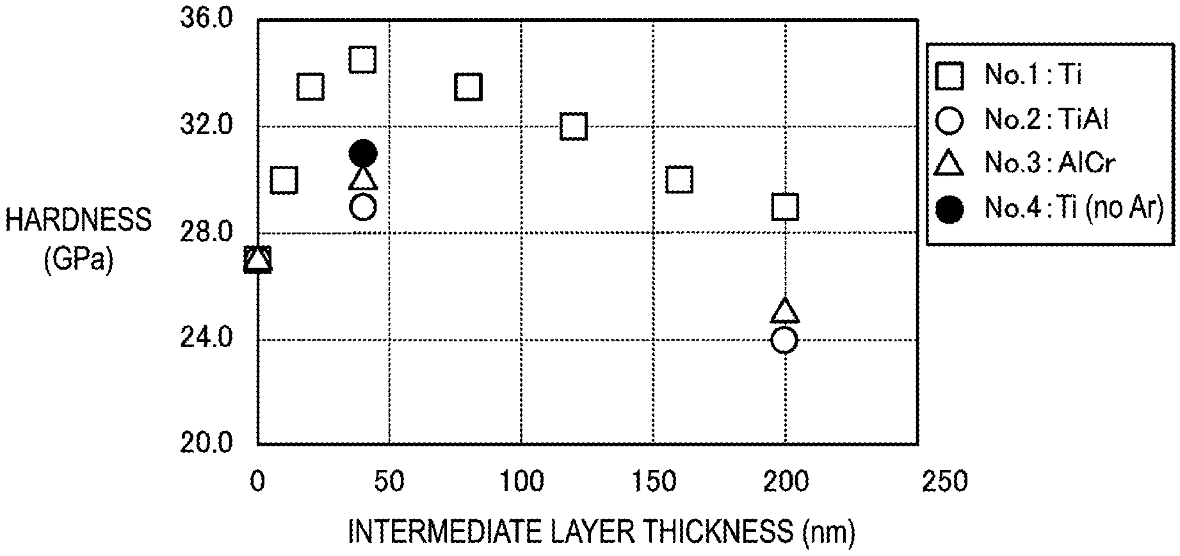
FIG. 5 is a graph showing results of hardness measurement.

FIG. 5 is a graph showing results of the hardness measurement. The horizontal axis of the graph shown in FIG. 5 is the intermediate layer thickness (nm), and the vertical axis is the hardness (GPa) of the coating layer. The data indicated by quadrangles in FIG. 5 indicates the hardness of the coating layer of Sample No. 1. The data indicated by open circles in FIG. 5 indicates the hardness of the coating layer of Sample No. 2. The data indicated by triangles in FIG. 5 indicates the hardness of the coating layer of sample No. 3. The data indicated by black circles in FIG. 5 indicates the hardness of the coating layer of Sample No. 4. In FIG. 5, the intermediate layer thickness 0 nm data indicates the measurement result of the hardness of a sample including no intermediate layer between the base and the coating layer (hereinafter, referred to as "non-inserted article").

As shown in FIG. 5, it was confirmed that all of Samples No. 1 to No. 4 had higher hardness than the non-inserted article when the intermediate layer thickness was 40 nm. In particular, it was confirmed that the hardness of Sample No. 1, which is Example of the present disclosure, was significantly increased when the intermediate layer thickness was 40 nm. In the range of the intermediate layer thickness 20 nm or more to 80 nm or less, the hardness of the coating layer of Sample No. 1 was 33.5 GPa or more.

On the other hand, in all of Samples No. 1 to No. 3, it was confirmed that the hardness of the coating layer was decreased when the intermediate layer was 200 nm compared to when the intermediate layer was 40 nm. Also, it was confirmed that when the intermediate layer thickness was 200 nm, the hardness of the coating layer of Sample No. 2 and Sample No. 3 was lower than that of the non-inserted article.

Residual Stress Measurement

Figure 6:
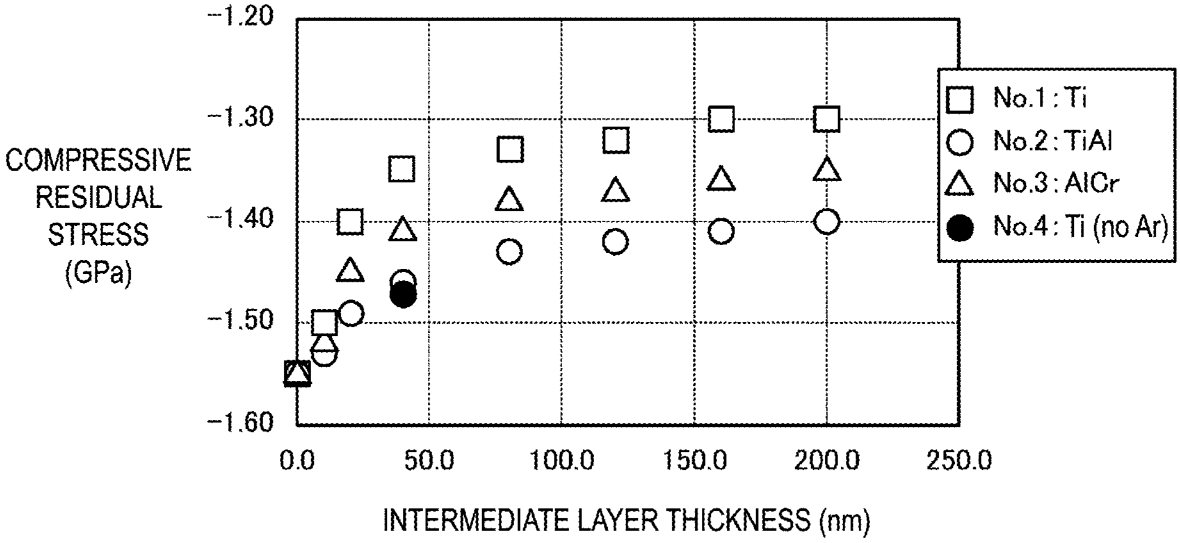
FIG. 6 is a graph showing results of compressive residual stress measurement on coating layers of Samples No. 1 to No. 4.

FIG. 6 is a graph showing results of residual stress measurement on the coating layers of Samples No. 1 to No. 4. The horizontal axis of the graph shown in FIG. 6 is the intermediate layer thickness (nm), and the vertical axis is the compressive residual stress (GPa).

In the present disclosure, the measurement position of residual stresses is a position on a 1 mm or more inner side from the rake face or the flank face of the cutting edge (on the central side). The residual stress was measured by an X-ray diffraction method. In the present disclosure, a 2D method (multi-axis stress-measuring method/full Debye ring fitting method) of the X-ray diffraction methods is used for the measurement, but a general X-ray diffractometer may be used for the measurement. A peak of the TiAlN (422) plane in which the value of 2θ appears in the range of 125° to 135° was used as an X-ray diffraction peak used for the measurement of the residual stress. The residual stresses were calculated by using the Poisson ratio of TiAlN=0.21 and the Young modulus=600000 MPa. As conditions for the X-ray diffraction measurement, CuKα rays were used as an X-ray source, and irradiation was performed under conditions of power=45 kV and 120 mA to measure the residual stress. When positive, the residual stress is tensile stress, and when negative, the residual stress is compressive stress. The measurement conditions are indicated in detail as follows.

Measurement Conditions

X-ray diffractometer: D8 DISCOVER PlusIμS manufactured by Bruker Japan K.K.

Radiation source: CuKα

Output: 45 kV, 120 mA

Collimator diameter: 0.5 mmφ

Measured diffraction line: TiAlN (422) plane 2θ≈129.990°

Measurement method: 2D method (φ angle: 10°, 27.5°, 45°)

Measurement time: 300 sec/frame

Measurement location: position on a 1 mm or more inner side from the cutting edge (on the central side)

Rocking: θ rocking (rocking width: θ=+/−2°)

Analysis Method

Analysis was performed by the 2D method. Note that the following physical property values were used.

TiAlN (422) plane

Young's modulus: 600000 MPa, Poisson ratio: 0.21

2D method: Peak Evaluation: Pearson VII

Stress model: Biaxial

In FIG. 6, the intermediate layer thickness 0 nm data indicates the residual stress of the coating layer directly layered on the base. The data indicated by quadrangles in FIG. 6 indicates the result of compressive residual stress of the coating layer of Sample No. 1. The data indicated by open circles in FIG. 6 indicates the result of compressive residual stress of the coating layer of Sample No. 2. The data indicated by triangles in FIG. 6 indicates the result of the compressive residual stress of the coating layer of Sample No. 3. The data indicated by black circles in FIG. 6 indicates the result of compressive residual stress of the coating layer of Sample No. 4.

As shown in FIG. 6, it was confirmed that the compressive residual stress of the coating layer decreases as the intermediate layer thickness increases regardless of the composition of the intermediate layer. In particular, it was found that in Sample No. 1 including the intermediate layer containing Ti and Ar, the compressive residual stress of the coating layer was significantly decreased compared to other Samples No. 2 to No. 4. In the range of the intermediate layer thickness 20 nm or more to 80 nm or less, the compressive residual stress of the coating layer of Sample No. 1 was 1.45 GPa or less, specifically 1.4 GPa or less.

Adhesion Force Measurement

Figure 7:
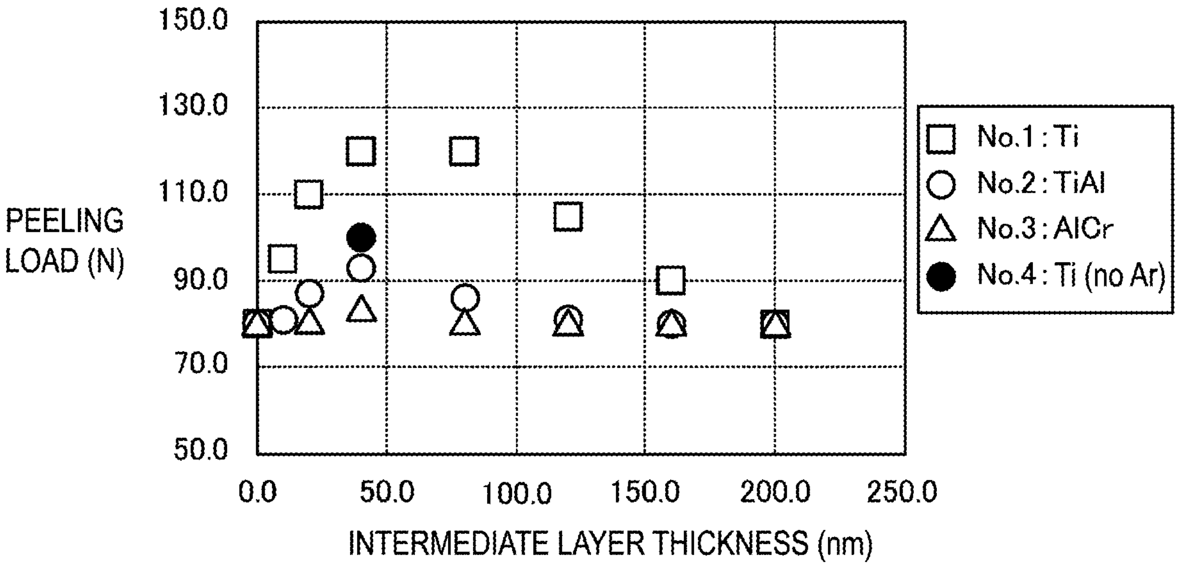
FIG. 7 is a graph showing results of adhesion force measurement.

Adhesion force of Samples No. 1 to No. 4 was measured by scratch tests. The scratch tests were performed by using a diamond indenter having a tip shape with a curvature radius R of 200 μm at a rate of 10 mm/min and a load rate of 100 N per minute. In the scratch tests, the load when peeling occurred (peeling load) was evaluated as adhesion force. The scratch tests indicate that as the critical load is larger, peeling is less likely to occur, that is, adhesion force is higher. FIG. 7 is a graph showing results of adhesion force measurement. The horizontal axis of the graph shown in FIG. 7 is the intermediate layer thickness (nm), and the vertical axis is the peeling load (N). In FIG. 7, the intermediate layer thickness 0 nm data indicates the measurement result of adhesion force of the coating layer in the non-inserted article.

As shown in FIG. 7, it was confirmed that in all of Samples No. 1, No. 2, and No. 4, when the intermediate layer thickness was 40 nm, the adhesion force was improved as compared to the non-inserted article. It was confirmed that when the intermediate layer thickness was 40 nm, the adhesion force of, in particular, Sample No. 1, which is Example of the present disclosure, was significantly improved compared to the other Samples No. 2 to No. 4. In the range of the intermediate layer thickness of 20 nm or more to 80 nm or less, the adhesion force of Sample No. 1 was 110 N or more.

On the other hand, it was confirmed that when the intermediate layer was the 200 nm, the adhesion force of each of Samples No. 1 and No. 2 was decreased compared to when the intermediate layer was 40 nm. It was confirmed that there was no significant change in adhesion force of the coating layer of Sample No. 3, regardless of the thickness of the intermediate layer.

FIG. 8 is a table summarizing the results of the aforementioned hardness measurement, stress measurement, and adhesion force measurement. In FIG. 8, the hardness, the stress, and the adhesion force of each of the Samples No. 1 to No. 3 are indicated by percentages when the hardness, the stress, and the adhesion force of the non-inserted article are each 100%.

As shown in FIG. 8, it was confirmed that when the intermediate layer thickness was 40 nm, the hardness and the adhesion force of Sample No. 1, which is Example of the present disclosure, were significantly improved compared to the non-inserted article and Samples No. 2 and No. 3. When the intermediate layer thickness was 40 nm, Sample No. 1 had a remarkable stress relaxation effect compared to the non-inserted article, the effect was also remarkable compared to Samples No. 2 and No. 3.

As is clear from the above results, when the intermediate layer thickness is 40 nm, Sample No. 1 including the intermediate layer containing Ti and Ar is comprehensively excellent in terms of improvement in hardness, stress relaxation, and improvement in adhesion force.

EDX Surface Analysis

Elemental analysis was performed on Sample No. 1 by EDX analysis. The analysis conditions are as follows.

(1) Sample pretreatment: thinning by FIB method (μ-sampling method)

(2) Elemental analysis (Surface analysis)

(3) Scanning transmission electron microscope: JEM ARM200F manufactured by JEOL Ltd.

Figure 9:
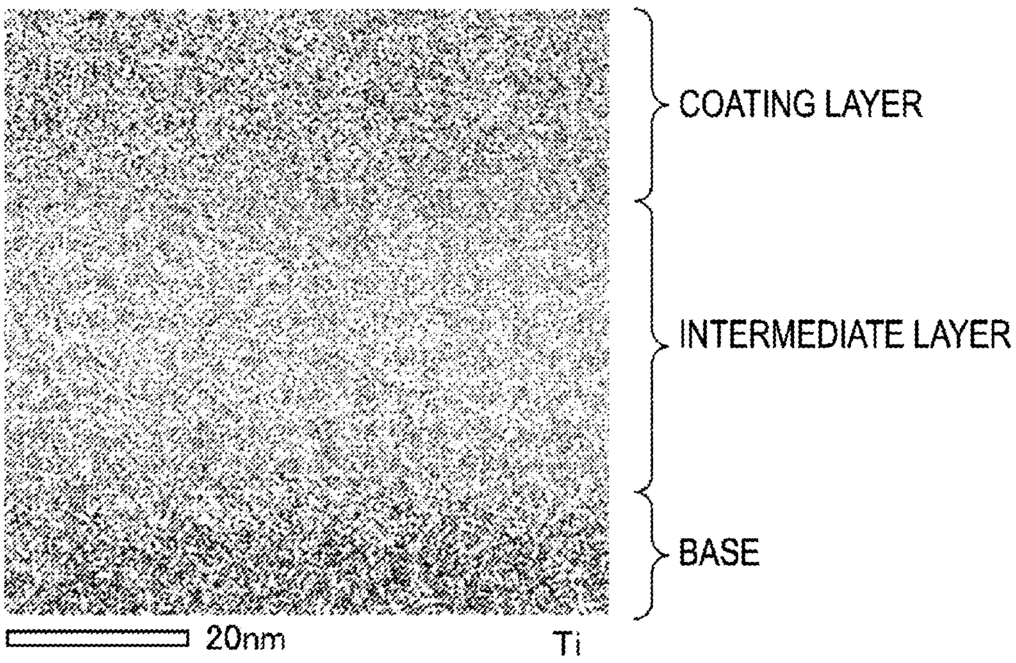
FIG. 9 is a diagram illustrating a Ti element mapping image in the intermediate layer of Sample No. 1.
Figure 10:
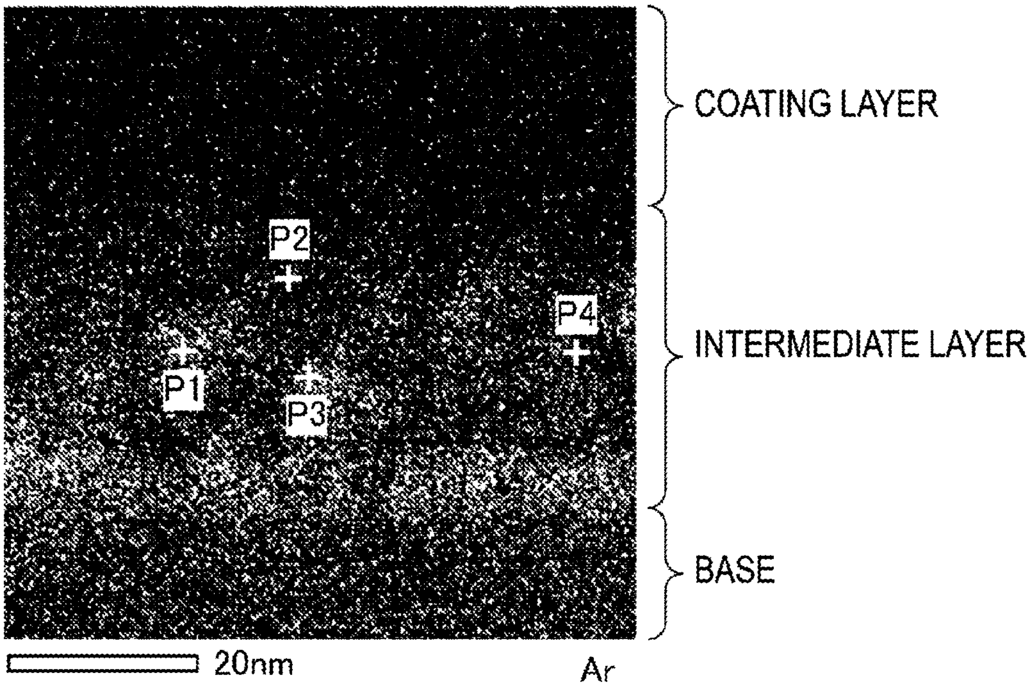
FIG. 10 is a diagram illustrating an Ar element mapping image in the intermediate layer of Sample No. 1.

(4) Acceleration voltage: 200 kV (5) Irradiation current: about 7.5 nA (6) Elemental analyzer: JED-2300T (7) Effective time: 60.0 sec (8) Energy range: 0 keV or more and 40 keV or less FIG. 9 is a diagram illustrating a Ti element mapping image in the intermediate layer of Sample No. 1. FIG. 10 is a diagram illustrating an Ar element mapping image in the intermediate layer of Sample No. 1.

As is clear from the mapping images illustrated in FIGS. 9 and 10, the intermediate layer of Sample No. 1 contains Ti and Ar. As is clear from the Ar mapping image illustrated in FIG. 10, the intermediate layer of Sample No. 1 includes a plurality of Ar-enriched regions distributed in island shapes. As illustrated in FIG. 10, it is found that the plurality of Ar-enriched regions is distributed, in the intermediate layer, more in the region on the side of the base from the central portion of the intermediate layer than in the region on the side of the coating layer from the center in the thickness direction of the intermediate layer.

FIG. 11 is a table showing element constituent ratios in atomic % at measurement points P1 to P4 illustrated in FIG. 10. The measurement points P1 and P3 correspond to the Ar-enriched regions, and the measurement points P2 and P4 correspond to the regions other than the Ar-enriched regions in the intermediate layer.

As shown in FIG. 11, the ratio of Ar at each of the measurement points P1 and P3 in the Ar-enriched regions was 5 atomic %. On the other hand, the ratio of Ar at the measurement points P2 and P4 other than the Ar-enriched regions was 1 atomic %. As is clear from the result, the Ar-enriched region is a region containing at least 3 atomic % or more, specifically, more than 1 atomic % of Ar in the intermediate layer.

From the results shown in FIG. 11, it was confirmed that the intermediate layer of Sample No. 1 contained N, Al, Nb, Mo, and W in addition to Ti and Ar. W was detected at the measurement point P2 other than the Ar-enriched regions, but was not detected at the measurement points P1 and P3 in the Ar-enriched regions.

From the results shown in FIG. 11, it is found that the intermediate layer of Sample No. 1 contained at least 65 atomic % or more of Ti and 1 atomic % or more of Ar.

Wear Test

Wear tests were performed on Samples No. 1 to No. 4 (intermediate layer thicknesses 10 nm, 20 nm, 40 nm, 80 nm, 120 nm, 160 nm, and 200 nm for Samples No. 1 to No. 3, and intermediate layer thickness 40 nm for Sample No. 4) and samples with no intermediate layer inserted. The wear tests were performed under the following conditions by using the kind of cermet materials for turning processing (model number: CNMG120408PQ).

(1) Cutting method: wet continuous cutting by using a round material of φ200

(2) Workpiece: SCM435

(3) Feed f: 0.20 mm/rev (4) Cutting ap: 1.0 mm (5) Evaluation method: Lateral flank surface wear (nose wear) after 60-minute cutting was measured with a microscope.

Figure 12:
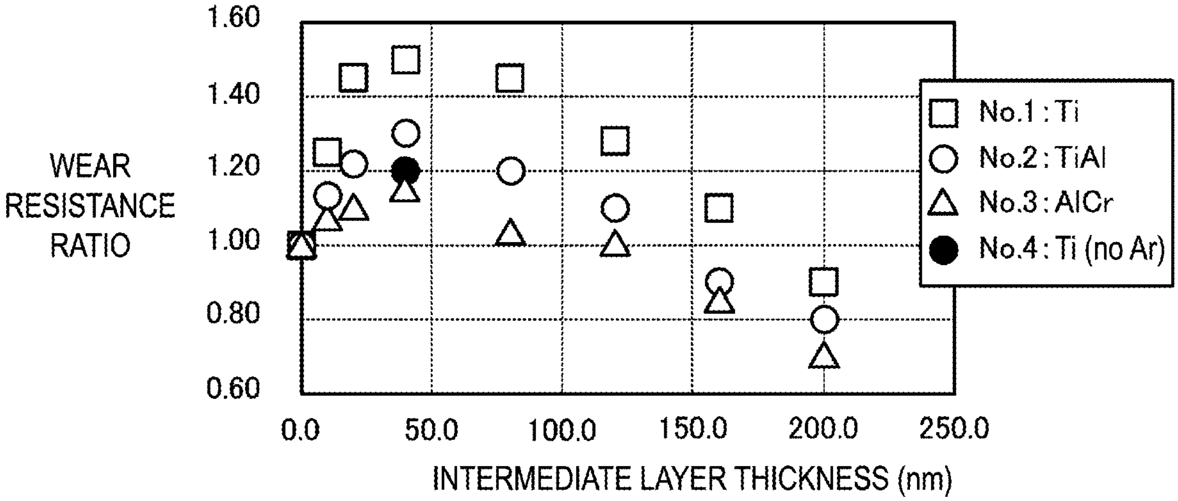
FIG. 12 is a graph showing results of wear tests.

FIG. 12 is a graph showing results of the wear tests. The horizontal axis of the graph shown in FIG. 12 is the intermediate layer thickness (nm), and the vertical axis is the ratio (wear resistance ratio) of the amount of nose wear of the non-inserted article to the amount of nose wear of the sample having each intermediate layer thickness. Specifically, the wear resistance ratio is the amount of nose wear of the non-inserted article to the amount of nose wear of each sample.

As shown in FIG. 12, the wear amount of Samples No. 1 to No. 3 was decreased in the range of the intermediate layer thickness of 10 nm or more to 80 nm or less compared to the non-inserted article including no intermediate layer. As is clear from the result, the wear resistance of Samples No. 1 to No. 3 is higher than that of the non-inserted article in the range of the intermediate layer thickness of 10 nm or more to 80 nm or less. As can be seen, of Samples No. 1 to No. 3, Sample No. 1 has particularly high wear resistance.

As described above, the insert (as an example, the insert 1) according to the embodiment includes the base (as an example, the base 2) and the coating layer (as an example, the coating layer 3) covering the surface of the base. The base is made of cermet. The coating layer is made of $Ti_{1-a-b-c-d}Al_aM_bW_cSi_d(C_xN_{1-x})$ (M is one or more metal elements selected from Nb, Mo, Ta, Hf, and Y, where $0.40 \le a \le 0.55$, $0.01 \le b \le 0.1$, $0.01 \le c \le 0.1$, $0.01 \le d \le 0.05$, and $0 \le x \le 1$). In the insert according to an aspect of the present disclosure, the intermediate layer (as an example, the intermediate layer 4) containing Ti is located between the base and the coating layer. The intermediate layer has an average thickness of 20 nm or more and 80 nm or less.

Therefore, the insert according to the embodiment can provide improved wear resistance.

The shape of the insert 1 illustrated in FIG. 1 is merely an example and does not limit the shape of the insert according to the present disclosure. The insert according to the present disclosure may include a body having, for example, a rotation axis and formed in a rod shape extending from a first end to a second end, a cutting edge located at the first end of the body, and a groove extending in a spiral shape from the cutting edge toward the second end of the body.

Further effects and variations can be readily derived by those skilled in the art. Thus, a wide variety of aspects of the present disclosure are not limited to the specific details and representative embodiments represented and described above. Accordingly, various changes are possible without departing from the spirit or scope of the general inventive concepts defined by the appended claims and their equivalents.

REFERENCE SIGNS

1 Insert
2 Base
3 Coating layer
4 Intermediate layer
21 Through hole
41 Ar-enriched region
70 Holder
73 Pocket
75 Screw
100 Cutting tool

The invention claimed is:

1. An insert, comprising:

a base;

a coating layer covering a surface of the base; and an intermediate layer containing Ti located between the base and the coating layer, wherein the coating layer is made of $Ti_{1-a-b-c-d}Al_aM_bW_cSi_d(C_xN_{1-x})$, where M is one or more metal elements selected from Nb, Mo, Ta, Hf, and Y, $0.40 \le a \le 0.55$, $0.01 \le b \le 0.1$, $0.01 \le c \le 0.1$, $0.01 \le \le d \le 0.05$, and $0 \le x \le 1$, the intermediate layer has an average thickness of 20 nm or more and 80 nm or less, and the intermediate layer contains 65 atomic % or more of Ti and 1 atomic % or more of Ar.

2. The insert according to claim 1, wherein the intermediate layer comprises a plurality of Ar-enriched regions.

3. The insert according to claim 2, wherein the plurality of Ar-enriched regions are distributed in island shapes in the intermediate layer.

4. The insert according to claim 2, wherein the intermediate layer comprises:

a first region on a side of the base; and a second region on a side of the coating layer, and the plurality of Ar-enriched regions are distributed more in the first region than in the second region.

5. The insert according to claim 1, wherein the coating layer has hardness of 33.5 GPa or more and compressive residual stress of 1.4 GPa or less.

6. The insert according to claim 1, wherein the coating layer has adhesive strength of 110 N or more in terms of a peeling load in a scratch test.

7. A cutting tool, comprising:

a holder extending from a first end toward a second end and comprising a pocket at a side of the first end; and the insert according to claim 1 located in the pocket.

8. The insert according to claim 1, wherein the intermediate layer contains 3 atomic % or more of Ar.

* * * * *